Figure 1:
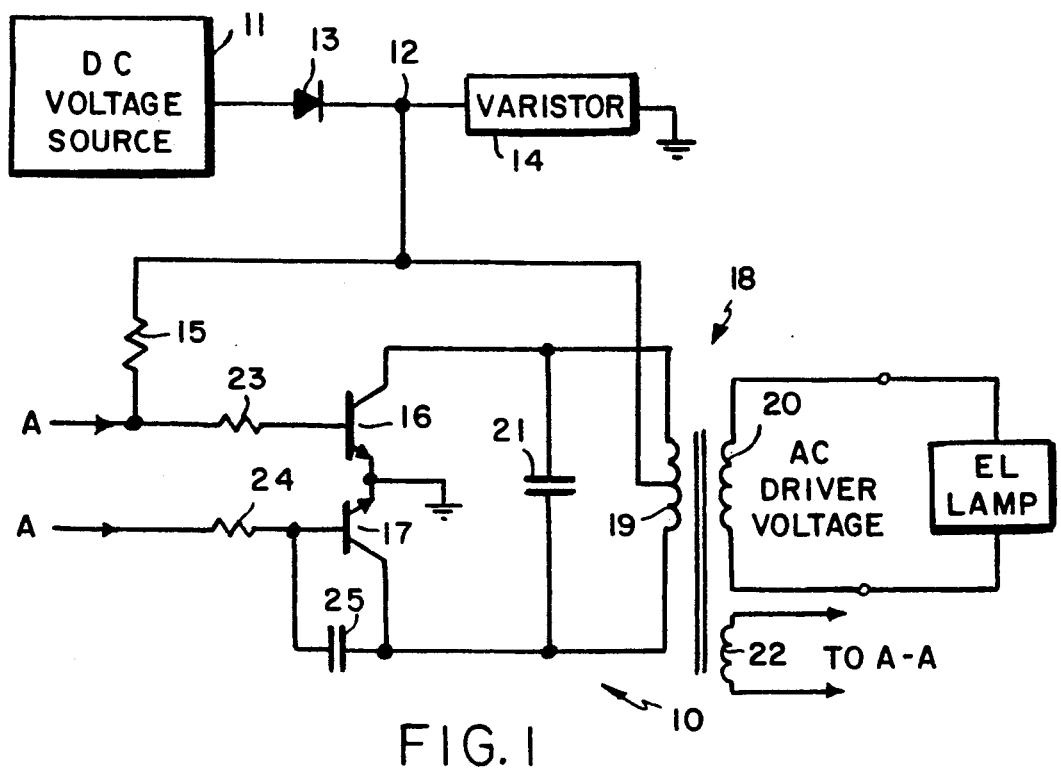

United States Patent [19]

Belek

[11] Patent Number: 5,317,497
[45] Date of Patent: May 31, 1994

[54] INTERNALLY EXCITED, CONTROLLED TRANSFORMER SATURATION, INVERTER CIRCUITRY

[75] Inventor: Ronald E. Belek, Coventry, Conn.

[73] Assignee: Loctite Luminescent Systems, Inc., Lebanon, N.H.

[21] Appl. No.: 884,724

[22] Filed: May 18, 1992

[51] Int. Cl.$^5$ ............................................. H02M 1/12
[52] U.S. Cl. ............................................. 363/40; 363/22; 363/133; 315/169.3
[58] Field of Search ....................... 363/22, 23, 24, 25, 363/26, 40, 41, 97, 133, 134; 315/169.3, 246

[56]  References Cited
U.S. PATENT DOCUMENTS

| | | | |
|---|---|---|---|
| 3,219,906 | 11/1965 | Keller et al. | 363/25 |
| 3,706,925 | 12/1972 | Engelhardt | 363/134 |
| 3,792,337 | 2/1974 | Gilmore | 363/25 |
| 3,818,312 | 6/1974 | Luursema et al. | 363/133 |
| 3,875,493 | 4/1975 | Kunzinger et al. | 363/25 |
| 3,996,506 | 12/1976 | Kichak | 363/22 |
| 4,004,251 | 1/1977 | Hesler et al. | 363/22 |
| 4,177,509 | 12/1979 | Bullinga | 363/133 |
| 4,519,023 | 5/1985 | Lester | 363/22 |
| 4,583,026 | 4/1986 | Kajiwara et al. | 363/133 |

Primary Examiner—J. L. Sterrett
Attorney, Agent, or Firm—Robert F. O'Connell

[57]  ABSTRACT

An inverter circuit for providing an AC driver voltage for a capacitive load from a DC input voltage. The circuit uses a pair of balanced transistors supplying a split primary winding of a transformer, a feedback winding thereof being coupled thereto to supply a feedback signal to the transistor inputs. Resistors are used to optimize inverter efficiency by adjusting transformer saturation and the DC bias of the drive transistors. A capacitor is connected across the two primaries to provide harmonic suppression an aid in starting the inverter. A second capacitor, connected from base to collector of the transistors opposite the transistor with DC bias being introduced, provides suppression of undesirable high frequencies which will occur if this capacitor is not present. The AC output is supplied from the secondary winding of the transformer.

9 Claims, 1 Drawing Sheet

INTERNALLY EXCITED, CONTROLLED TRANSFORMER SATURATION, INVERTER CIRCUITRY

INTRODUCTION

This invention relates generally to electronic inverter circuitry and, more particularly, to improved inverter circuitry for use in driving primarily capacitive loads, such as electroluminescent lamp devices, such circuitry using relatively few components and having relatively higher power output and higher efficiency than is available in conventionally used electroluminescent driver circuitry.

BACKGROUND OF THE INVENTION

Inverter circuits for converting DC voltages into AC driver voltages for driving essentially capacitive loads, such as electroluminescent lamp devices, for example, normally utilize single-ended output driver circuits which are relatively inefficient, i.e., they provide a relatively low output to input power ratio and produce relatively low power sufficient to produce luminescence only over a relatively small area of luminosity.

Capacitive loads have a low power-factor, that is, the voltage and current are out of phase by a phase angle approaching 90 degrees. Conventional internally excited inverters, used to drive capacitive loads in a continuous manner, suffer from the fact that the transformer drive circuit therein usually attempts to drive a low power factor, e.g., capacitive, load with drive circuitry that is optimized for resistive loads, which have a power factor essentially equal to one and in which the voltage and current are in phase. This mismatch between the drive circuit and load results from the fact that the transformer can only present feedback at a phase angle of 0° or 180° with respect to the primary excitation. If the feedback transformer winding is then used to drive the transformer power drive circuitry, high peak currents occur in the transformer so as to cause a saturation thereof. The high peak currents provide no useful output because the transformer, being saturated at this time, can couple no additional power to the output.

Attempts at controlling such transformer saturation have conventionally been made by simply limiting the drive to a single sided drive transistor. Because the single sided driver doesn't control the transformer saturation over an entire cycle, however, the fundamental frequency, drive waveform is distorted, thereby producing harmonic output signals having frequencies higher than the desired drive fundamental frequency, and the overall efficiency is reduced. The distortion of the drive waveform causes a even further penalty when used for driving electroluminescent lamps. Because of the physical construction of electroluminescent lamps, frequencies higher than the desired drive frequency result in unwanted losses due to heating and premature aging or deterioration of the lamps.

Inverters used in power supply applications, or inverters that use single-ended switching devices, such as diodes or transistors, at their outputs effectively disconnect the output during one-half of each cycle. The resulting waveform is non-sinusoidal and contains high frequency harmonics that are not only not usable but are detrimental to an electroluminescent lamp, as mentioned above. Inverters for this type of application attempt to fully saturate the transformer so that, by doing so, the linear losses associated with the switching devices are reduced. Because an electroluminescent lamp cannot use the harmonic components that are generated in a fully saturated switching device, this type of inverter does not provide optimally effective operation for use as an electroluminescent lamp driver circuit. DC to AC converters that work into resistive loads can function at relative high efficiencies because resistive loads can utilize the harmonic content as usable power. When such converters are used with capacitive type loads, which operate in response to a single fundamental frequency, such as in light emitting devices, particularly of the electroluminescent type, the efficiency thereof is reduced.

Inverter driver circuits having double-ended outputs, i.e., ones using a dual driver circuitry, have been proposed for use with electroluminescent devices. One such circuit is made by Hero Electronics, Ltd. of Bedfordshire, England, in their Model D10542 inverter device. Such driver circuitry uses a relatively standard dual transistor drive circuit supplied from a DC voltage source which circuit requires a specially designed transformer that does not use standard laminations and bobbins. While the transformer secondary output winding provides an AC output driver voltage, the circuitry has a relatively low efficiency and produces a driver voltage for providing luminescence only over a relatively small area, e.g., less than 10 square inches.

The principal drawback to such a circuit is that no means is provided to control the saturation of the output transformer. Therefore, when the inverter attempts to provide power to an electroluminescent lamp, the drive signal is starting when the transformer is already saturated. Further, such circuitry, as in conventional single-ended circuits used for such purpose, is subject to high current surges which undesirably saturate the transformer windings, the circuit also being subject to producing undesirable high frequency oscillations superimposed on the output driver signal. Moreover, when the load of the electroluminescent device is removed, a sufficiently high current surge may occur as to adversely affect, or damage, the circuit.

Accordingly, it is desired to provide inverter driver circuitry for electroluminescent devices which uses relatively few components to achieve cost reductions, has improved efficiency and sufficient power to provide luminescence for areas as high as 80–100 square inches, or more, for example, and uses a conventional output transformer configuration having standard laminations and bobbins. Such circuitry should be designed so as to provide better efficiency and to avoid the generation of undesired high frequency oscillations.

BRIEF SUMMARY OF THE INVENTION

An inverter circuit, in accordance with the invention, uses a balanced, dual-drive transistor circuit which supplies a balanced output to the split-primary winding of a transformer having a standard transformer lamination/bobbin structure, the secondary winding of which produces a desired AC driver output voltage for use in driving a capacitive load, such as an electroluminescent lamp device.

The balanced transistor circuit is supplied with a DC voltage via a common input resistance and a pair of current limiting resistances and includes a capacitor connected between the base and the collector electrodes of one of the transistors, which capacitance has a value selected to suppress the generation of undesired high frequency oscillations in the AC output driver signal. The current limiting resistors limit the current that occurs in the circuit to a selected peak level, thereby preventing high peak surges of current from being supplied to the balanced transistor circuit. The values of the common input resistance and the current limiting resistors are selected to provide an optimum combination thereof to produce the necessary control for setting precise transistor drive parameters to control the transformer saturation. The common input resistor is connected to a positive power supply lead, which resistor can be thought of as providing a DC bias for the transistor pair. The current limiting resistors which are connected in series with a feedback circuit can be viewed as providing a desired AC drive bias for the transistors. Thus, by using a minimum number of components, complete control of the dual drive transistors is achieved. The values of the common input resistance and the current limiting resistances are adjusted to provide the most effective power transfer efficiency for the overall inverter circuit.

DESCRIPTION OF THE INVENTION

Figure 2:
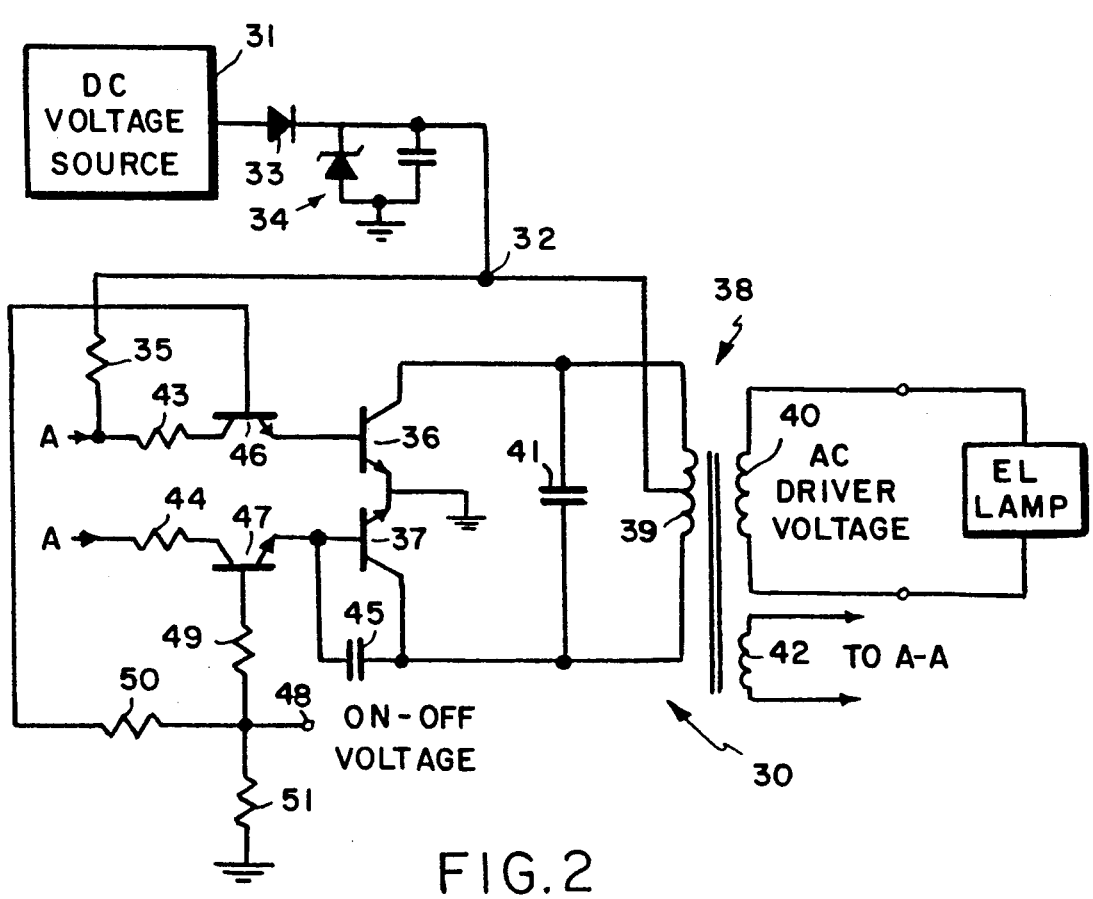

The invention can be described in more detail with the help of the accompanying drawings wherein FIG. 1 shows a schematic diagram of one embodiment of the inverter circuitry of the invention; and FIG. 2 shows a schematic diagram of an alternative embodiment of the inverter circuitry of the invention.

As can be seen in FIG. 1, an inverter circuit 10 is supplied at an input terminal 12 with a DC voltage from a DC voltage source 11. A pair of surge protectors for eliminating positive and negative voltage surges from source 11 are used at the DC voltage input portion of the circuitry of FIG. 1. Thus, a standard diode 13 can be used to protect against negative surges and a varistor 14, e.g., a Model 36280 metal oxide varistor available from General Electric Co. of Schnectady, N.Y., can be used to protect against positive surges. In the exemplary embodiment shown in FIG. 1, a DC voltage of 6.0 volts is provided to inverter circuit 10 via a common input resistor 15 for supply to the input base electrodes of a pair of balanced transistors 16 and 17, the emitter electrodes of which are connected to a reference level, such as ground. The collectors of transistors 16 and 17 supply a balanced output voltage to a split primary winding 19 of a transformer 18. A capacitor 21 is connected across the primary winding 19 and, accordingly, the circuit provides a balanced AC voltage at the split primary winding 19, the secondary winding 20 of transformer 18 thereby providing the desired AC output driver voltage. The AC driver voltage is supplied to a capacitive load which effectively responds to a single fundamental frequency and does not respond, or responds adversely, to higher frequency harmonics present in the driver voltage. Such load is, for example, a light emitting device such as an electroluminescent lamp.

A feedback winding 22 of the transformer provides a positive feedback path in the inverter circuit for generating the desired AC oscillations for ultimately producing the AC output driver voltage. In a particular embodiment, the above discussed elements of the balanced circuit of FIG. 1 can have the following exemplary values:

Resistor 15 = 470 ohms

Capacitance 21 = 0.1 uF

Using MJE 180 type transistors, readily available from various manufacturers, the 6 volt DC input voltage can be converted to an AC driver voltage of 120 volts at 400 Hz. The transformer is one having standard laminations and bobbins and can be designed so as to provide the required AC driver operation based on the input DC voltage available and the desired AC output voltage needed to drive the electroluminescent device in the application in which the circuit is to be used. Such transformer design would be well within the skill of those in the art.

In order to improve the efficiency of the inverter circuit 10, a pair of current limiting resistors 23 and 24 are used at the inputs to balanced transistors 16 and 17. In the specific embodiment discussed above, each of the resistors is selected to have a value of 270 ohms. A high frequency suppressor capacitance 25 is connected between the base and collector electrodes of transistor 17, as shown, and, in the particular embodiment being described, is selected to have a value of 0.01 uF.

The selection of the values of the input resistance 15 and the current limiting resistors 23 and 24 is made so as to provide an effective transformer saturation control which allows for optimum matching of the inverter to the electroluminescent lamp. The use of capacitor 25 eliminates the problem of generating high frequency oscillations in the AC output driver voltage.

The embodiment depicted in FIG. 2 has generally the same balanced inverter circuit configuration as in FIG. 1, circuit 30 using balanced transistors 36 and 37, a transformer 38 having a split primary winding 39, a secondary winding 40, a feedback winding 42 and a capacitance 41 across the primary winding thereof. A DC voltage source 31 supplies a DC voltage at terminal 32 to the transistors via a common input resistor 35. In the particular DC voltage circuit of FIG. 2, the negative and positive surge protectors are a diode 33 and a parallel Zener diode/capacitance circuit 34, respectively. Current limiting resistors 43 and 44 and a high frequency suppressor capacitance 45 are used, as before. In a particular embodiment, specific circuit element values are:

Resistance 35 = 1000 ohms

Resistance 43 = 180 ohms

Resistance 44 = 180 ohms

Capacitance 41 = 0.1 uF

Capacitance 45 = 0.01 uF

In a particular application of the invention in accordance with the circuit of FIG. 2, the DC voltage source supplies a DC voltage of 9.6 volts and the transformer secondary winding supplies an AC output driver voltage of 100 volts at 405 Hz. Again, the above values of input resistance 35 and current limiting resistances 43 and 44 are selected to provide a desired impedance match to produce the most effective efficiency of operation of the circuit.

In addition, the inverter circuit 30 in FIG. 2 includes further circuitry to permit the operation of the circuit to be controlled in an on-off manner. For such purpose, serial transistors 46 and 47 are connected between current limiting resistors 43 and 44 and transistors 36 and 37, respectively, as shown. An on-off voltage (e.g., a 5.0 volt signal for an "on" mode and a 0 volt signal for an "off" mode) is supplied at on-off control terminal 48 to the base electrodes of transistors 46 and 47 via an input resistance network comprising resistances 49, 50 and 51, as shown. When an "on" voltage is supplied at terminal 48 (e.g., 5.0 volts), the transistors 46 and 47 act in effect as short circuits and the inverter circuitry operates to produce the desired AC output driver voltage at secondary winding 40. When an "off" voltage is supplied at terminal 48 (e.g., 0 volts), the transistors act as open circuits and no output voltage is produced at transformer secondary winding 40. Thus, the circuit operation can be controlled in an on-off manner using an externally applied control voltage, the application of which may be controlled in accordance with a selected operating condition for causing the circuit to become either operative or non-operative, as desired.

In general, for both the circuits of FIGS. 1 and 2, the turns ratio of the transformer windings and the values of the common input resistance and the current limiting resistances in the inverter circuit are selected, as mentioned above, so as to provide the best impedance match between the input impedance and the output impedance of the circuit for the most efficient power transfer operation thereof, i.e., to maximize the power transfer through the circuit to the load. The selection of such resistances to provide such impedance matching effectively prevents transformer saturation and effectively eliminates the generation of high frequency harmonics in the output driver voltage. Such impedance matching can be obtained using techniques which would be well within the skills of those in the art.

While the particular embodiments described above represent preferred embodiments of the invention as devised for specific application to electroluminescent lamp devices, variations therein may occur to those in the art within the spirit and scope of the invention. Hence, the invention is not to be construed as limited to the particular embodiments described herein, except as defined by the appended claims.

What is claimed is:

1. An inverter circuit for providing a low harmonic content AC output driver voltage for an electroluminescent lamp, from a DC voltage source, said inverter circuit comprising
    a transformer saturation control circuit which includes
    means for controlling a DC and an AC feedback drive to a pair of balanced transistors having input and output electrodes;
    a transformer having
        a split primary winding having a first capacitance connected across said primary winding and connected to the output electrodes of said transistors;
        a feedback winding coupled to said primary winding for supplying said AC feedback drive to the input electrodes of said transistors; and
        an output secondary winding coupled to said primary winding for providing an AC output driver voltage to said electroluminescent lamp; and
    a second capacitance connected between the input and output electrodes of one of said transistors;
    said transformer saturation control circuit thereby suppressing the harmonic content of the AC output driver voltage.

2. An inverter circuit in accordance with claim 1 wherein said means for controlling the DC and AC feedback drive includes resistance means.

3. An inverter circuit in accordance with claim 2 wherein the input electrodes of said transistors are the base electrodes thereof and the output electrodes of said transistors are the collector electrodes thereof.

4. An inverter circuit in accordance with claim 1 or 2 wherein said first capacitance means is connected from the collector of one said pair of transistors to the collector of the other of said pair of transistors.

5. An inverter circuit in accordance with claim 4 wherein said second capacitance means is connected from a base electrode of one of said pair of transistors to the collector electrode of the same transistor.

6. An inverter circuit in accordance with claim 1 wherein said controlling means includes first resistance means connected to said feedback winding and to the base of each of said transistors, respectively, and second resistance mans is connected to said DC voltage source, said primary winding and said first resistance means, said first and second resistance means controlling transformer saturation level.

7. An inverter circuit in accordance with claim 1 wherein said controlling means further includes current limiting means and further control circuit means connected between said current limiting means and the input electrodes of said transistors for permitting the inverter circuit to operate in controllable on-off operating modes.

8. An inverter circuit in accordance with claim 7 wherein said further control circuit means includes control transistors connected in series with said current limiting means and the input electrodes of said transistor; and transistor control means for controlling the operation of said control transistors to cause the inverter circuit to operate in said on-off operating mode.

9. An inverter circuit in accordance with claim 8 wherein said control circuit means further includes means for supplying a first voltage level tot he control electrodes of said control transistors to place said inverter circuit in an on operating mode and for supplying a second voltage level to said control electrodes to place said inverter circuit in an off operating mode.

* * * * *